United States Patent [19]

Koerper

[11] Patent Number: 4,962,614
[45] Date of Patent: Oct. 16, 1990

[54] PERFORATED PLANT VESSEL FOR EPIPHYTES

[75] Inventor: Hans Koerper, Geretsried, Fed. Rep. of Germany

[73] Assignee: Vivaria GmbH, Import von Pflanzen und Tieren, Fed. Rep. of Germany

[21] Appl. No.: 255,132

[22] Filed: Oct. 6, 1988

[30] Foreign Application Priority Data

Oct. 8, 1987 [DE] Fed. Rep. of Germany ....... 3734074
Aug. 12, 1988 [DE] Fed. Rep. of Germany ... 8810282[U]

[51] Int. Cl.⁵ .............................................. A01G 9/02
[52] U.S. Cl. .............................................. 47/66; 47/83
[58] Field of Search ................ 47/86, 83, 66; 52/DIG. 2, 608

[56] References Cited

U.S. PATENT DOCUMENTS

| 1,614,958 | 1/1927 | Hornby | 446/123 |
| 1,740,057 | 12/1929 | Babich | 47/83 |
| 2,871,619 | 2/1959 | Walters | 446/118 |
| 3,076,289 | 2/1963 | Gallo | 47/83 |
| 3,566,529 | 3/1971 | Kner | 446/118 |
| 3,987,579 | 10/1976 | Palenik | 446/118 |
| 4,040,630 | 8/1977 | Brattain | 446/118 |
| 4,212,134 | 7/1980 | Brokamp | 47/86 |
| 4,551,110 | 11/1985 | Selvage | 446/122 |
| 4,561,208 | 12/1985 | Schultz | |

FOREIGN PATENT DOCUMENTS

| 2639565 | 9/1976 | Fed. Rep. of Germany . | |
| 2801004 | 7/1978 | Fed. Rep. of Germany . | |
| 1171587 | 6/1984 | Fed. Rep. of Germany | 52/608 |
| 8505654 | 9/1985 | Fed. Rep. of Germany . | |
| 3437205 | 4/1986 | Fed. Rep. of Germany . | |
| 3536572 | 4/1987 | Fed. Rep. of Germany . | |
| 734213 | 10/1932 | France | 446/118 |
| 2390088 | 12/1978 | France | 47/83 |
| 360314 | 2/1931 | United Kingdom | 446/123 |
| 588302 | 5/1947 | United Kingdom | 52/DIG. 2 |

*Primary Examiner*—Henry E. Ruduazo
*Attorney, Agent, or Firm*—Christie, Parker & Hale

[57] ABSTRACT

A perforated plant vessel that can be assembled by using plastic components including at least one base plate with insertion openings, apertures and lateral wall segments with insertion projections adapted to the insertion openings. The individual parts are well-suited to plants, visually attractive, can be stored easily and can be assembled in various shapes so as to form vessels of different sizes.

The plant vessel is particularly suitable for epiphytes in living areas.

13 Claims, 8 Drawing Sheets

PERFORATED PLANT VESSEL FOR EPIPHYTES

BACKGROUND

Epiphytes, which are are also called perchers, have recently joined, as ornamental plants other plants which for a long time have been cultivated in soil or hydroponics in living areas. These epiphytes are plants that live in natural surroundings on bushes or trees and, in some cases, on stones or the like. They use the above-mentioned bases essentially as a support for their roots, but do not obtain their nutritive substances therefrom. In most cases epiphytes obtain nutritive substances via the leaves, aerial roots or the like, i.e. they do not require any soil. It follows that for cultivating these plants in flats or the like it will primarily be necessary to use a supporting structure.

German Utility Model 85 05 564 discloses an epiphyte basket whose lateral wall segments consist of individual rods, which extend horizontally in use and which are held together at their corners by means of connection elements extending continuously in the vertical direction. The connection elements extend through holes provided in said rods. The connection elements provided are rigid elements, such as chains. The same connection elements additionally hold a base at the lower part of the epiphyte basket. The assembly of the known vessel requires a troublesome stringing of the individual rods onto the connection elements and the disassembly requires a correspondingly troublesome removal. In the case of a basket which already contains the plants, this manipulation becomes particularly difficult and may easily cause damage to the plants. For making structural modifications, an epiphyte basket suspended by means of the connection elements, as intended, must be taken down a supported carefully in a manner suitable for the respective plant until a structural modification has been carried out. Spacers, which may possibly have to be inserted between the lateral wall segments, must also be stringed on the continuous connection elements. A further disadvantage of the known epiphyte basket is that the continuous connection elements must have a length which is sufficient for the maximum possible height of the wall. It follows that in the case of a low overall height or at the beginning of the growth of the plants the projecting rods or chain ends will be excessively long and impair the outward appearance.

The present invention aims to solve the task of providing a plant vessel for epiphytes, which, on the basis of an economical mode of production, can be assembled, disassembled and structurally modified in a simple manner, with or without plants, and which is well-suited to plants and as well as being attractive.

SUMMARY OF THE INVENTION

In the case of the plant vessel according to the invention, each lateral wall segment separately rests via its attachment projections on the lateral wall segment and the base plate, respectively, disposed therebelow. Hence, it can be attached and removed individually. With the exception of the small vertical insertion movement, each lateral wall segment can be moved from the side towards its place and, consequently, towards a plant contained in the basket. It is thus guaranteed that the plant can be treated as carefully as possible. A modification of the structural design is possible also in the suspended condition of the vessel and without removing said vessel from the suspension means. With regard to its handling and also with regard to its outward appearance, the vessel is primarily suitable for and also intended for receiving therein plants used for interior decoration as well as for permitting simple cultivation of said plants by those interested in such cultivation. Making the vessel of plastic material permits easy production of said vessel in various colors which can be adapted to the respective plants. When being transplanted, the plants can easily by removed from the plastic components without any damage bein caused to the roots during the removal. The components can be round and can have rounded edges, i.e. they can have a structural design which is well-suited to plants. The durability permits a long period of use as well as reuse, and, if necessary, the vessel can also be disassembled and stored.

The vessel can selectively be used for suspension or for standing in an upright position.

An assembly of components can be provided in a kit which may comprise supporting feet of different lengths so that feet height is increased in a simple manner when the roots grow. The vessel stands safely and the outward appearance is not impaired.

Insertion pins which serve as upper closure means for closing insertion openings in the lateral wall segments or base plate may also be provided for the purpose of keeping the vessel clean. Closed openings prevent the accumulation of plant watering fluid or dust once provde an attractivc closure means at the edge portions.

A collecting bowl for dripping water, which is adapted to be secured to the base plate in an advantageous manner may also be provided along with fastening means for the collecting bowl.

An advantageous further development is that the collecting bowl simultaneously serves—when the vessel stands upright—as a support member supporting, in turn, the holding members, which extend through the holes provided in the base plate, and/or support rods screwed into the base plate.

The supporting feet as well as suspension rods can be attached simultaneously.

BRIEF DESCRIPTION OF THE DRAWINGS

Embodiments of the invention will be explained hereinbelow with reference to the drawings, in which.

DETAILED DESCRIPTION

Figure 1:
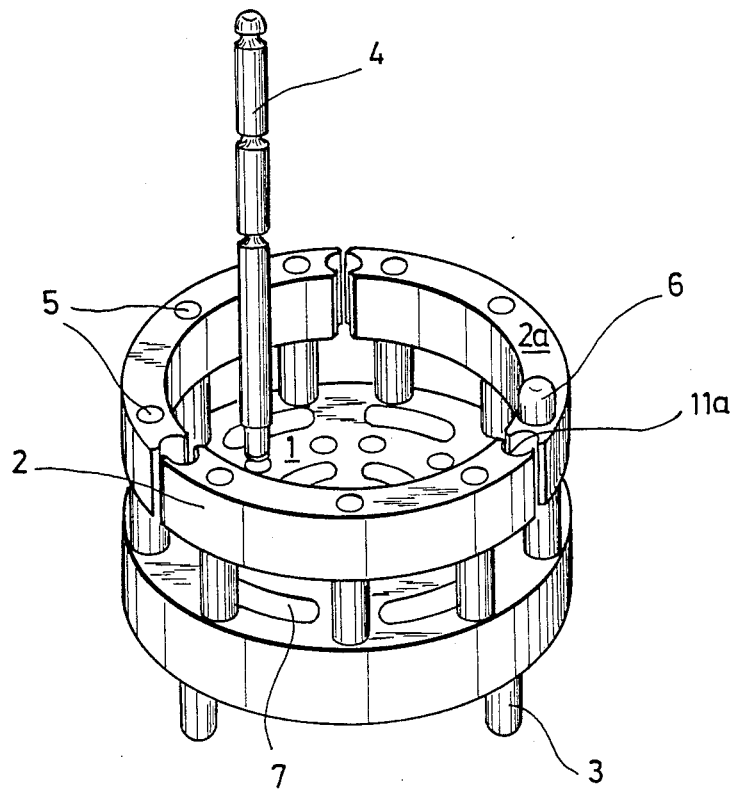
FIG. 1 shows a perspective view of a vessel according to the invention.

The vessel, a perspective view of which is shown in FIG. 1, is may be made by assembling the components which may be in the form of a kit. All the individual components consist of plastic material of the like and are connected without using metallic connection components or the like. The kit in the embodiment illustrated constsits of a base plate 1 and lateral wall segments 2. The base plate 1 has additionally secured thereto downwardly projecting supporting feet 3. A support rod 4 is held in the interior of the vessel such that it projects therein. One of the insertion openings 5 provided in longitudinal edge 2a of an upper lateral wall 2 is closed by an insertion pin 6.

Figure 2:
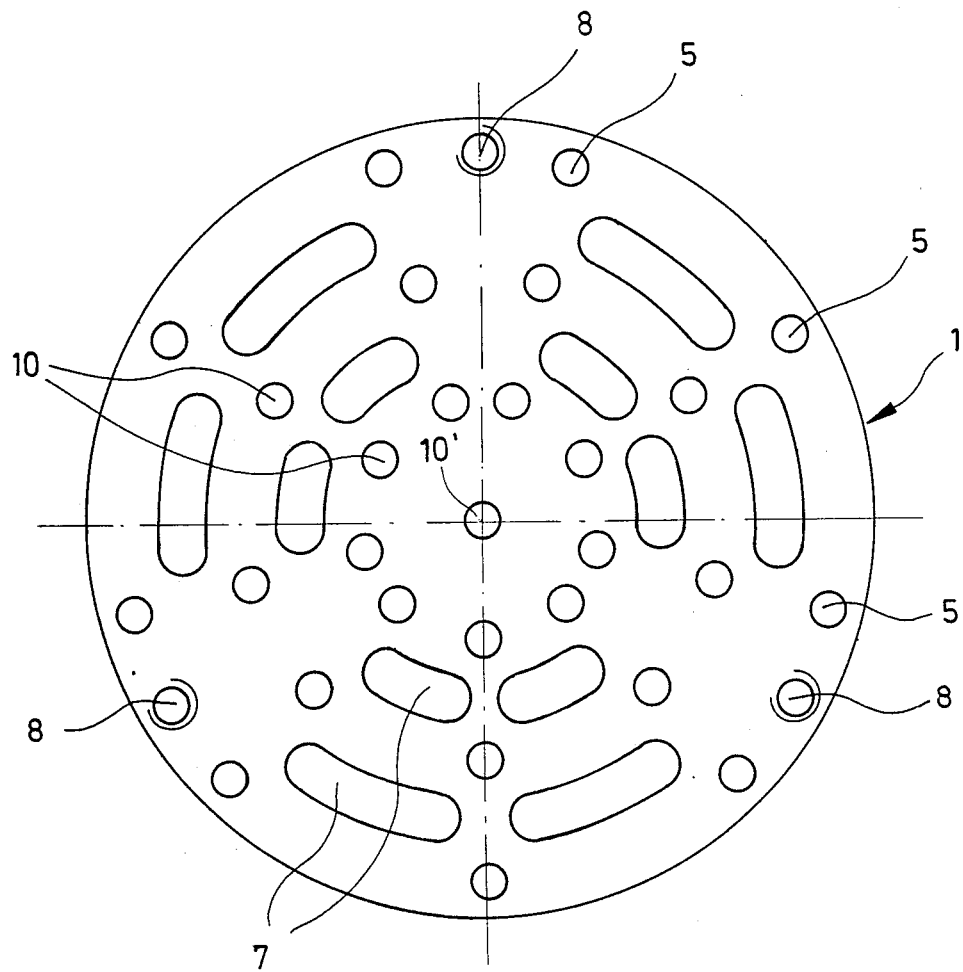
FIG. 2 shows a top view of a base plate of the vessel according to FIG. 1.

FIG. 2 shows a top view of the base plate 1. It forms the base of the assembled vessel and is provided with apertures 7 for plant roots. The apertures 7 are distributed over the surface in the form of elongate holes of different sizes and which are rounded on all sides. In the case of the present embodiment, the apertures are arranged along circles which are concentric with the plate center.

Figure 7:
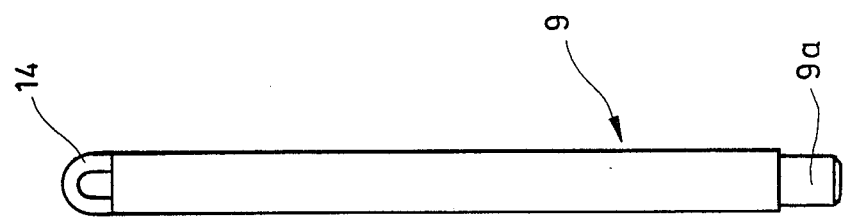
FIG. 7 shows a side view of suspension rod.
Figure 14:
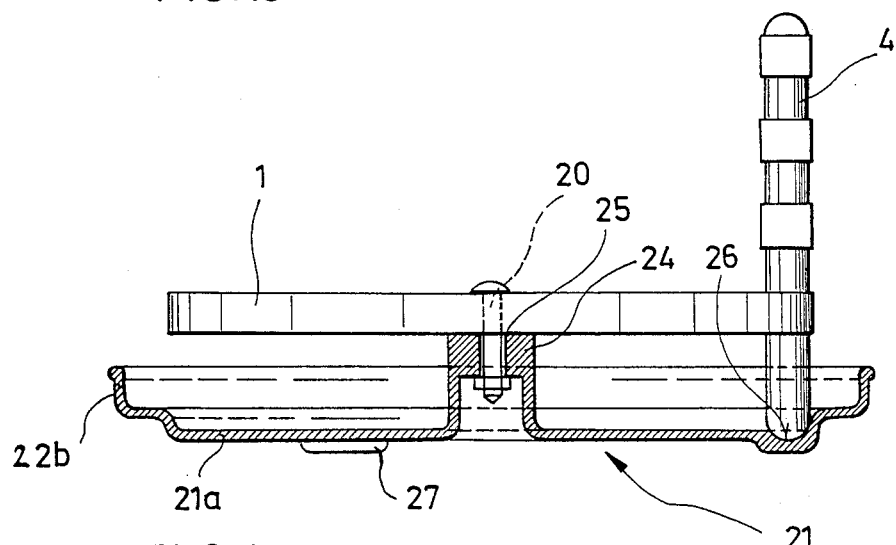
FIG. 14 shows a sectional view through XIII—XIII of the collecting bowl in FIG. 13.

The base plate is provided with insertion openings 5 which are used for the insertion of lateral wall segments 2. The insertion openings 5 are arranged on an ideal circle which is parallel to the edge of the plate and which is located close to said edge. Three such insertion openings are provided for each lateral wall segment. On the whole, the base plate is used for receiving therein three lateral wall segments. A through-hole 8 provided with a thread is arranged between respective neighboring insertion openings for neighboring lateral components. The tapped holes 8 are located on the same ideal circular line as the insertion openings 5 and they are positioned at regular intervals, i.e. at a respective arcuate distance of 120°. The tapped holes are intended for selectively screwing in the supporting feed 3 from below and/or suspension rods 9 (FIG. 7) from above. Numerous holes 10 are distributed over the base plate between the apertures 7, in the case of this embodiment also on ideal circular lines. Each hole 10 can be used for insertion of a support rod 4 for fastening the plants thereto, and it is thus possible to arrange said support rods 4 in a manner which is adapted to the respective needs of the individual plant. Holes which do not have any rod inserted therein are, just as the apertures 7, available for access of air or as holes through which roots can pass. A central hole 10' can accommodate a screw 20 for fastening a collecting bowl 21 (FIG. 14).

Figure 4:
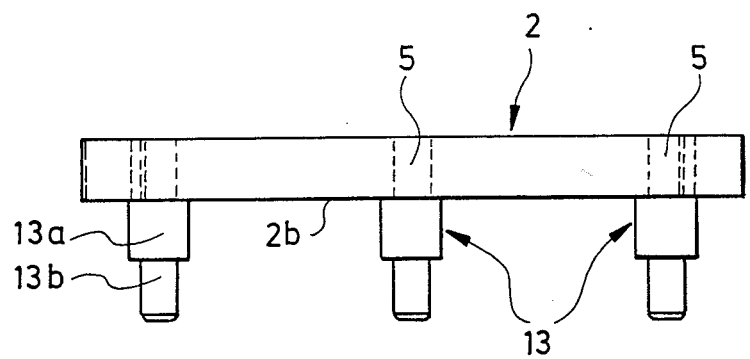
FIG. 4 shows a side view of the lateral wall segment according to FIG. 3.
Figure 3:
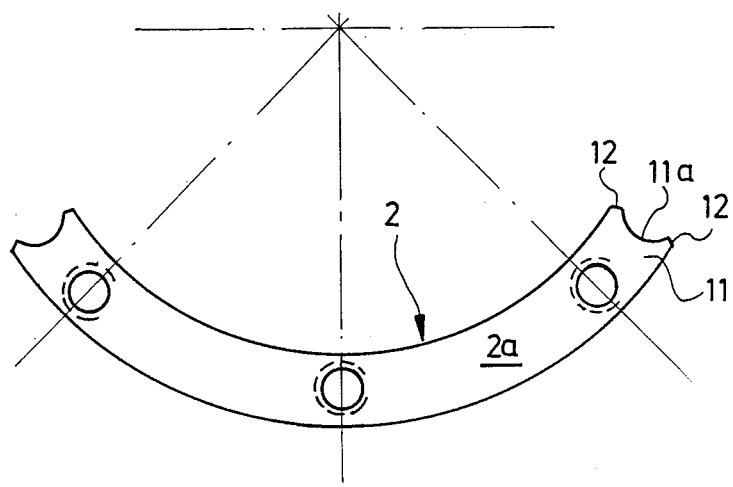
FIG. 3 shows a top view of a lateral wall segment of the vessel according to FIG. 1.

A lateral wall segment 2 formed as an integral plastic component is shown in FIGS. 3 and 4. It is provided with a strip 11 having rounded edges, and an arcuate shape corresponding to that of the base plate and the cross-section of which is approximately square. The end faces 11a on each side of the strip are essentially concave with portions 12 which are slightly bevelled towards the strip edges. When the lateral wall segments are arranged side by side on the base plate, a free space is obtained through which a suspension rod 9 can be passed, and then held in one of the tapped holes 8. The lower longitudinal edge 2b of the strip has formed thereon three insertion projections 13. Each insertion projection 13 consists of two sections 13a and 13 b having a circular cross-section. The section 13a follwoing the strip has the larger diameter. The section 13b has a diameter which is adapted to the insertion openings 5 of the base plate. The section 13a serves as a spacer. The upper longitudinal edge 2a of the strip 11 has provided therein insertion openings 5, which are coaxial with the insertion projections and the dimensions of which correspond to the insertion openings 5 of the base plate. It follows that each lateral wall segment 2 can be attached to the base plate as well as to another lateral wall segment, the distance being guaranteed by the sections 13a. It is thus possible to assemble the vessel such that it has lateral walls of an arbitrary height.

Figure 5:
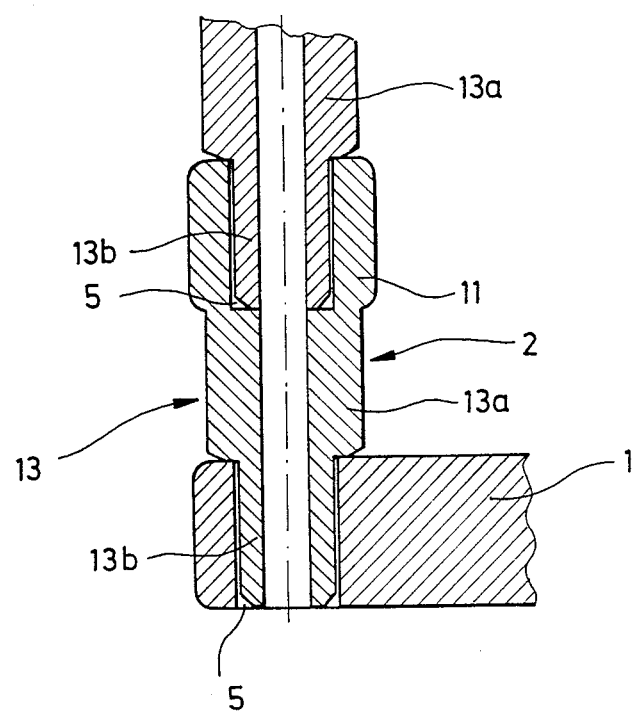
FIG. 5 shows a sectional view through a connecting area between the base plate and two lateral wall segments arranged relative to each other.

FIG. 5 shows in a partial sectional view a connecting area: the insertion opening 5 of the base plate 1 has inserted therein the section 13b of an insertion projection 13. The associated section 13a extends over the base plate 1 and carries the strip 11 of a lateral wall segment 2. The insertion opening 5 of said strip has inserted therein the section 13b of an additional lateral wall segment, which is, in said FIG. 5, only outlined by its insertion projections. The section 13a of the second lateral wall segment is broken off.

Figure 6:
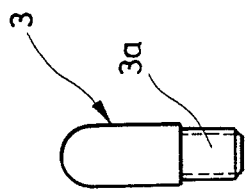
FIG. 6 shows a side view of supporting foot.

FIG. 6 shows a supporting foot 3 of the type outlined in FIG. 1. Said supporting foot is an elongate body having a circular cross-section, one end of said elongate body being rounded, and the other end has attached thereto a threaded stem 3a. This threaded stem is adapted to be screwed into one of the tapped holes 8 of the base plate when the finished vessel is intended to be standing. The kit for the finished vessel can comprise supporting feet of different lengths. If necessary, the supporting height of the vessel can be increased in a simple manner by exchanging the supporting feet for longer ones.

If the vessel is not intended to be standing, but to be suspended, suspension rods 9 can be screwed into the tapped holes 8 from above. The suspension rod shown in FIG. 7 comprises a body which has a circular cross-section and a threaded stem 9a at one end thereof, said threaded stem being adapted to the tapped holes 8 in the base plate. The other end of said body has formed thereon a suspension loop 14. The whole suspension rod consists of plastics.

Figure 8:
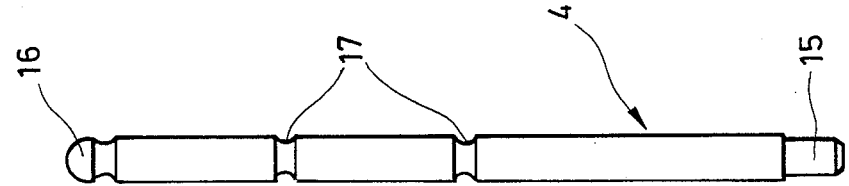
FIG. 8 shows a side view of support rod.

FIG. 8 shows a support rod 4 of the type outlined also in FIG. 1. The rod, which has circular cross-section and which is made of plastic material in one piece, has at one end thereof a tenon 15, which is adapted to the insertion openings 5 of the base plate. The other longitudinal end has formed thereon a rounded head 16. Recesses 17, in the present case two, are distributed over the length of the support rod 4 in spaced relationship with one another. The recesses are annular and rounded in a concave configuration. Using these recesses, binding means for fastening the plant can be attached without any difficulties.

Figure 9:
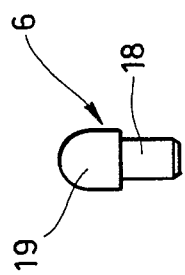
FIG. 9 shows a side view of an insertion pin.

An additional supplementary part of the kit is shown in FIG. 9, viz. an insertion pin 6, one example of said pin being already shown in FIG. 1. An insertion tenon 18, the diameter of which is adapted to the insertion openings 5, carries a round head 19 whose diameter is larger than that of the tenon 18. The insertion pin 6 can be used arbitrarily for covering insertion openings 5, especially the insertion openings of the respective uppermost lateral wall segments.

It can easily happen that plant watering fluid and contamination accummulate in the insertion openings of the lateral wall segments, and it will then be difficult to remove said water and contamination, respectively. When the holes 10 provided in the base plate have a diameter which corresponds to that of the insertion openings 5, the insertion pins 6 can also be used for reducing the number of openings in the base plate.

Figure 10:
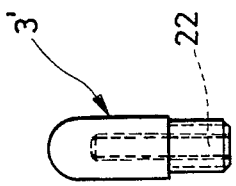
FIG. 10 shows a side view of a different embodiment of a supporting foot.

A different embodiment of a supporting foot 3', which can be seen from FIG. 10, is provided with a tapped hole 22, which is open towards the upper side of the base plate when the supporting foot has been screwed into said base plate. It follows that the supporting foot attached to the base plate can, in turn, be used for holding a suspension or support rod, which is adapted to be screwed into the tapped hole and the threaded projection of which is provided with an appropriately small thread.

Figure 11:
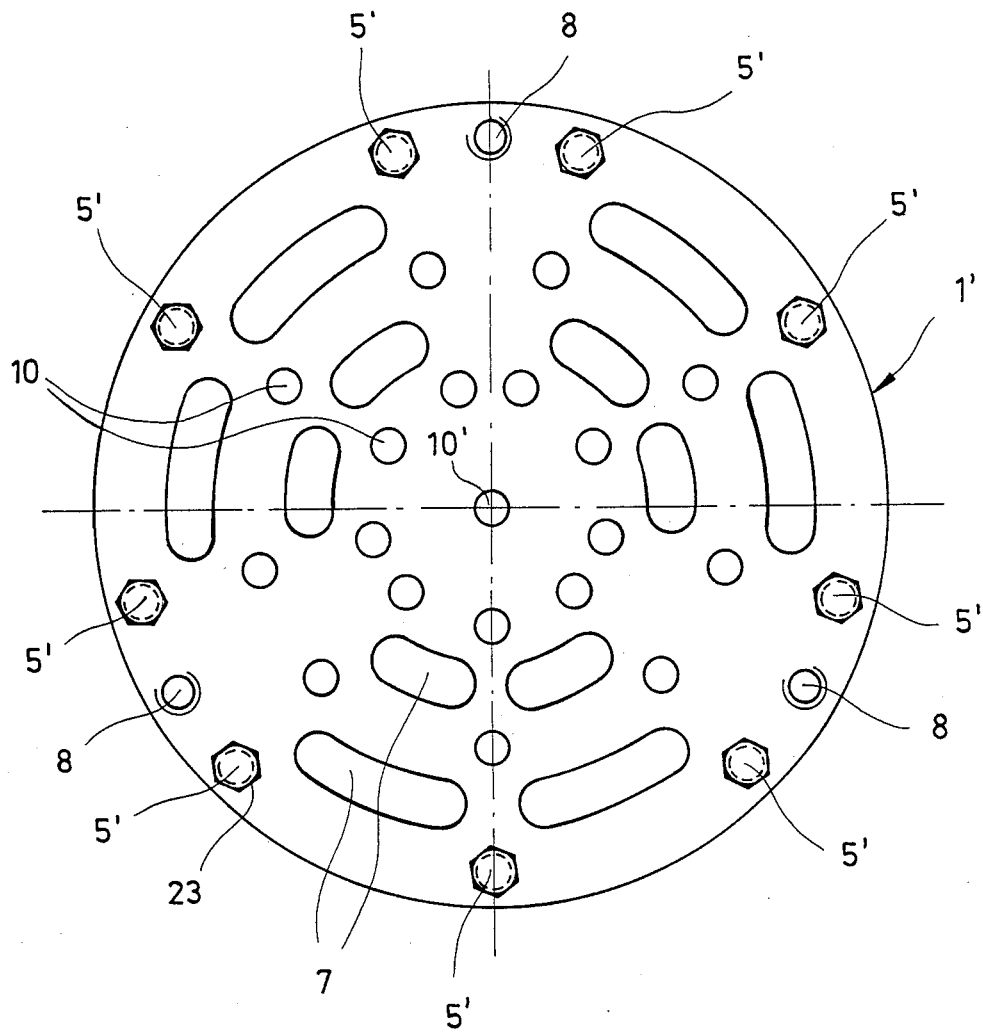
FIG. 11 shows a top view of a different embodiment of a base plate.
Figure 12:
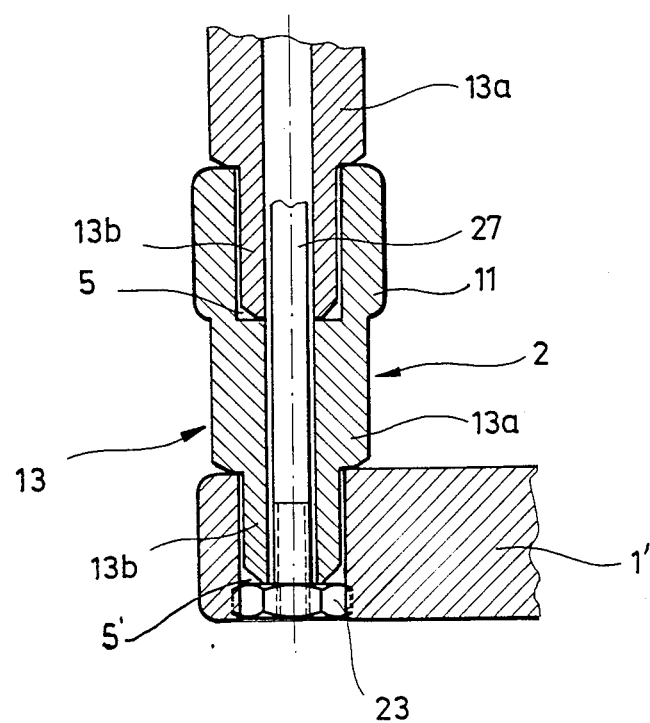
FIG. 12 shows an enlarged partial section view through a connecting area between the base plate according to FIG. 11 and attached lateral wall elements.

For plant vessels in the case of which it must be reckoned with that the lateral wall segments are subjected to particular stress and load, the embodiment of a base plate 1', which is shown in FIG. 11, can be used. Instead of simple insertion openings 5 (FIG. 1), said base plate 1' is provided with hexagonal nuts 23, which are made of metal, preferably high-quality steel, and which are cast in openings 5'. Hence, screws 27, which extend through the respective openings 5 in the lateral wall segments and through the associated insertion projections 13 and which, preferably, also consist of high-quality steel, can be screwed into the base plate 1', whereby the lateral wall segments are secured additionally. This is shown in FIG. 12.

Instead of casting the hexagonal nuts 23 in the base plate 1', it is also possible to provide hexagonal recesses in said base plate into which the nuts can be inserted from below, if necessary. Said nuts must then upwardly rest on shoulders of the recesses.

Figure 13:
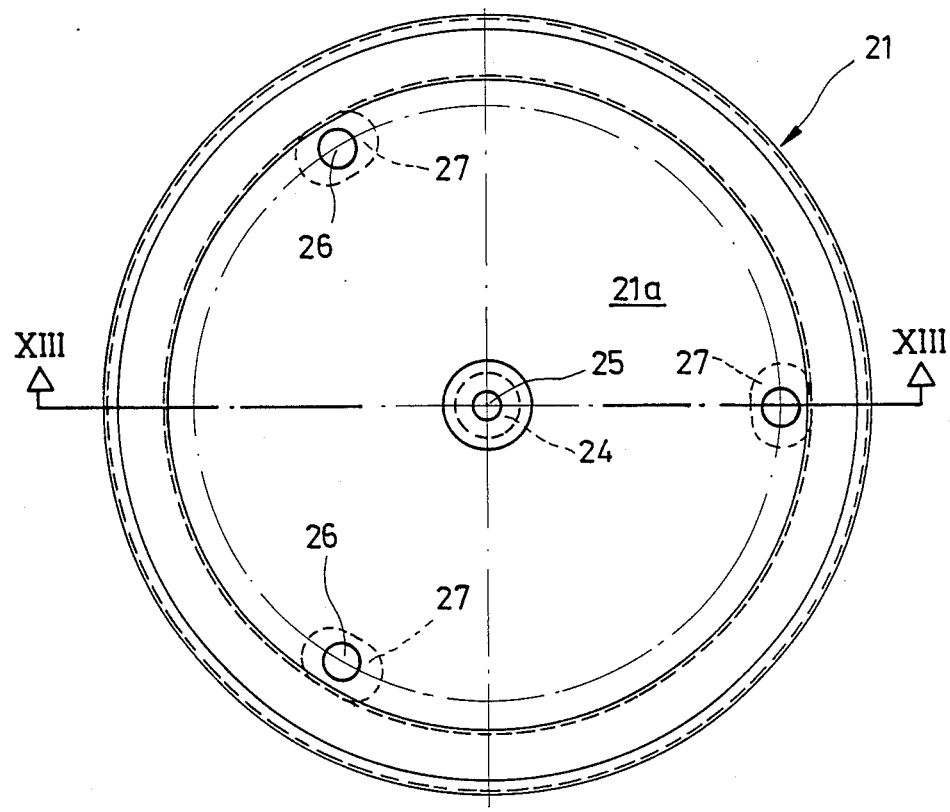
FIG. 13 shows a top view of a collecting bowl.

For further supplementing the kit, a collecting bowl 21 for dripping water is provided, said collecting bowl being shown in FIGS. 13 and 14. Its diameter exceeds the diameter of the base plate 1, and the base surface 21a of said bowl is additionally followed by an upward projecting rim 22b, which is provided with an outward directed step. At the center of said bowl, a protrusion 24 is provided, said protrusion 24 extending upwards over the whole height of said bowl and being provided with a hole 25. FIG. 13 shows how the collecting bowl 21 can be connected to the base plate 1 by means of this hole and with the aid of the screw 20.

The base 21a is additionally provided with three base recesses 26 representing a support possibility for a support rod 4, as indicated on the right-hand side of FIG. 14. Moreover, the recesses 26 are arranged such that their arrangement corresponds to that of the tapped holes 8 in the base plate 1 and—provided that the collecting bowl is fastened in a suitable manner—they can also be used for supporting suspension rods 9 screwed therethrough. In the area of the base recesses 26, oval bearing surfaces 27 are formed on the underside of the collecting bowl 21, said bearing surfaces being used as feet for the collecting bowl when the vessel is intended to be standing.

The invention is not limited to this embodiment. The kit according to the invention can widely vary with regard to its form. For example, base plates having different contours, e.g. also rounded-rectangular, hexagonal or oval contours, are imaginable. The respective lateral wall segments can have suitably curved structural designs, but they may also have a straight structural design. Within the framework of the present invention, it is also possible to imagine lateral wall segments, which are not stripshaped, but which have a flat-surface structural design, i.e. a larger height, the desired apertures being then formed on said lateral wall segments.

Provided that the walls are sufficiently thick, attachment possibilities for increasing the height of the wall are feasible in this case as well.

The above-described adaptation of the lateral wall segments to suspension rods which are insertable therebetween is not absolutely necessary. It is definitely possible to provide tapped holes for suspension rods in spaced relationship with the lateral wall segments; said tapped holes can be provided within as well as outside of the lateral walls. The connection between the base plate and the feet or suspension rods via threads guarantees that the components in question are held together firmly. However, plug-in connections, especially for the feet, can be employed as well. If desired, it is possible to assemble the base plate such that it simultaneously has feet which are attached by means of a plug-in connection and suspension rods which are screwed into tapped holes at a different location.

I claim:

1. A perforated plant vessel of plastic material for holding epiphytes or similar plants, which, in natural surroundings, grow without any soil on other plants or stones; said vessel comprising at least one base, said base comprising a base plate with insertion openings, apertures adapted to receive plant roots and holes; at least one support rod insertable into said holes; lateral, horizontally extending strip-like wall segments of approximately the shape of a strip being arranged at the periphery of the base plate and corresponding to the shape of said base plate, said lateral wall segments having first and second longitudinal edges, the first of the longitudinal edges of said lateral wall segments having insertion projections which coincide with insertion openings in the base plate, the second of said longitudinal edges of the lateral wall segments having insertion openings for the receipt of insertion projections of additional lateral wall segments, each insertion projection of each wall segment including a section having a diameter comparatively larger than the diameter of the insertion openings which serves to space said wall segment from said base or from an adjacent wall segment.

2. A vessel according to claim 1 wherein the base plate is circular and the lateral wall segments are curved to resemble an arc of a circle.

3. A vessel according to claim 1 further comprising suspension rods which are adapted to be inserted into the base plate.

4. A vessel according to claim 1 wherein the base plate is provided with reception means for supporting feet.

5. A vessel according to claim 4 wherein the reception means are tapped holes and the supporting feet are provided with threaded projections.

6. A vessel according to at least claim 4 wherein the support rods are provided with circumferentially extending recesses.

7. A vessel according to claim 4 further comprising insertion pins for selectively serving as upper closure means for closing insertion openings and holes in the lateral wall segments and the base plate.

8. A vessel according to claim 4 further comprising a collecting bowl secured to the base plate.

9. A vessel according to claim 8 wherein the base plate has a central hole and the collecting bowl is provided with a centrally arranged, upwardly extending protrusion having a hole to receive a screw insertable through the central hole of the base plate.

10. A vessel according to claim 8 wherein the collecting bowl is provided with base recesses in an arrangement corresponding to that of the tapped holes in the base plate so as to support said support rods in said base plate.

11. A vessel to claim 10 wherein the base recesses are formed on the underside as one of round and oval extended bearing surface for the collecting bowl.

12. A vessel according to claim 1 furtther comprising fastener screws and threaded nuts, said fastening screws extending through the insertion projections of the lateral wall segments and being insertable into said threaded nuts for fastening thereto.

13. A vessel according to claim 8, wherein said nuts and screws are made of steel.

* * * * *